(12) United States Patent
Oh et al.

(10) Patent No.: US 9,131,114 B2
(45) Date of Patent: Sep. 8, 2015

(54) METHOD FOR ENCRYPTING CONTENT, METHOD FOR DECRYPTING CONTENT AND ELECTRONIC APPARATUS APPLYING THE SAME

(75) Inventors: Sung-Bo Oh, Suwon-si (KR); Ji-Sung Oh, Seongnam-si (KR); Jae-Hwan Oh, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 13/379,297

(22) PCT Filed: Jun. 1, 2010

(86) PCT No.: PCT/KR2010/003498
§ 371 (c)(1),
(2), (4) Date: Dec. 19, 2011

(87) PCT Pub. No.: WO2010/147317
PCT Pub. Date: Dec. 23, 2010

(65) Prior Publication Data
US 2012/0148048 A1 Jun. 14, 2012

(30) Foreign Application Priority Data

Jun. 17, 2009 (KR) .......................... 10-2009-0053923

(51) Int. Cl.
*H04L 9/16* (2006.01)
*H04N 21/435* (2011.01)
(Continued)

(52) U.S. Cl.
CPC .............. *H04N 7/1675* (2013.01); *H04L 9/16* (2013.01); *H04N 21/2347* (2013.01); *H04N 21/23439* (2013.01); *H04N 21/26609* (2013.01); *H04N 21/4405* (2013.01); *H04N 21/4408* (2013.01); *H04N 21/44236* (2013.01)

(58) Field of Classification Search
None
See application file for complete search history.

(56) References Cited

U.S. PATENT DOCUMENTS 8,132,024 B2 * 3/2012 Nakano et al. ................ 713/193
2004/0174998 A1 * 9/2004 Youatt et al. .................. 380/210

(Continued)

FOREIGN PATENT DOCUMENTS

EP     2 068 320 A1    6/2009
KR    10-2008-0132011 A   12/2006

(Continued)

OTHER PUBLICATIONS

International Search Report dated Dec. 20, 2010 from the International Searching Authority in counterpart application No. PCT/KR2010/003498.

(Continued)

*Primary Examiner* — Samson Lemma
*Assistant Examiner* — Simon Kanaan
(74) *Attorney, Agent, or Firm* — Sughrue Mion, PLLC

(57) ABSTRACT

A method for encrypting content includes using a plurality of different encryption schemes to produce encrypted content. Encryption information is provided so as to indicate which of the plurality of different encryption schemes is used on portions of the content that was encrypted. Encryption information and the encrypted content are both sent as a content stream to another device. The decryption involves using the encryption information to help control the decryption so that the correct one of a plurality of different decryption schemes is applied to the proper portions of the encrypted content.

18 Claims, 6 Drawing Sheets

(51) Int. Cl.
  *H04N 7/167* (2011.01)
  *H04N 21/2343* (2011.01)
  *H04N 21/2347* (2011.01)
  *H04N 21/266* (2011.01)
  *H04N 21/4405* (2011.01)
  *H04N 21/4408* (2011.01)
  *H04N 21/442* (2011.01)

(56) References Cited

U.S. PATENT DOCUMENTS

| | | | |
|---|---|---|---|
| 2006/0034462 A1* | 2/2006 | Lee | 380/277 |
| 2008/0123859 A1 | 5/2008 | Mamidwar | |
| 2008/0127312 A1 | 5/2008 | Iwamoto et al. | |
| 2008/0209231 A1 | 8/2008 | Kim et al. | |
| 2008/0235517 A1 | 9/2008 | Ohmori et al. | |

FOREIGN PATENT DOCUMENTS

| | | |
|---|---|---|
| KR | 10-0732056 B1 | 6/2007 |
| KR | 10-0753932 B1 | 8/2007 |
| KR | 10-2008-0010004 A | 1/2008 |
| WO | 2004/057830 A1 | 7/2004 |
| WO | WO 2006/080754 A1 | 8/2006 |

OTHER PUBLICATIONS

Written Opinion of the International Searching Authority dated Dec. 20, 2010 in counterpart application No. PCT/KR2010/003498.
Communication dated Jul. 3, 2014 issued by the European Patent Office in counterpart European Patent Application No. 10789644.1.
"High-bandwidth Digital Content Protection System"; Revision 1.3; Digital Content Protection LLC; Dec. 21, 2006; pp. 1-90; XP007910735.
Communication dated May 2, 2015 issued by the Korean Intellectual Property Office in counterpart Korean Patent Application No. 10-2009-0053923.

* cited by examiner

METHOD FOR ENCRYPTING CONTENT, METHOD FOR DECRYPTING CONTENT AND ELECTRONIC APPARATUS APPLYING THE SAME

TECHNICAL FIELD

The inventive concept relates to a method for encrypting, a method for decrypting, and an electronic apparatus applying the same. More particularly, the inventive concept relates to a method for encrypting and transmitting content and a method for decrypting and reproducing a received content.

DESCRIPTION OF RELATED ART

Since the image quality and the sound quality of digital content does not deteriorate even if the digital content is copied, and also since digital content is easy to copy, the copyright on digital content is frequently infringed.

To prevent the unauthorized copying of digital content, various encryption technologies have been developed. To counter this, however, the technology to hack the key used to encrypt/decrypt digital content has also been developed; the unauthorized copying of digital content has therefore not been fully prevented.

Accordingly, there is a demand for a method of providing stronger protection of digital content against unauthorized copying. Also, such protection should be achieved by a method for reinforcing a means for encrypting digital contents and a method for reinforcing a means for authenticating an apparatus which requests digital contents.

DETAILED DESCRIPTION

The inventive concept has been developed to help solve or ameliorate the above problems. One or more of the exemplary embodiments may include a method for complex encryption of content by the complex application of a plurality of encrypting schemes to selected digital content, as a method for reinforcing a means for encrypting digital contents.

Also, one or more of the exemplary embodiments may include a method for the complex decryption of content which has been encrypted by the complex application of a plurality of encrypting schemes, as described above.

In addition, one or more of the exemplary embodiments may include a method for updating a hacked key list that is stored in an apparatus with reference to a hacked key list stored in a different external apparatus, as a method for reinforcing a means for authenticating an apparatus which requests digital contents.

According to an aspect of an exemplary embodiment, there is provided a method for encrypting content, the method including: complex encryption by the complex application of a plurality of encrypting schemes to selected content, and adding encryption information to the content which is encrypted by the complex application of a plurality of encrypting schemes in the complex encryption operation.

The complex encryption may include the complex application of the plurality of encrypting schemes on at least one of a frame basis, a field basis, and a line basis.

The plurality of encrypting schemes may include a high bandwidth digital content protection XOR (HDCP-XOR) encrypting scheme and an HDCP-XNOR encrypting scheme.

The adding of the encryption information may include: 1) if the content is encrypted on the frame basis, adding the encryption information to every frame, 2) if the content is encrypted on the field basis, adding the encryption information to every field, and 3) if the content is encrypted on the line basis, adding the encryption information to every line.

The method may further include: authenticating a connected apparatus, and transmitting a content stream, including the content that has been encrypted in a complex manner, and also including the encryption information, to the connected apparatus, and the complex encryption may be performed if the authentication succeeds.

The method may further include updating a hacked key list which is referred to in authenticating the connected apparatus.

The updating may include: receiving a hacked key list of a connected external apparatus from the external apparatus, and adding to the hacked key list a hacked key that is recorded on the hacked key list of the external apparatus but does not exist in the hacked key list.

The hacked key list may be received from one of a network, a broadcast signal, a storage medium, and content stored in a storage medium.

According to an aspect of another exemplary embodiment, there is provided an electronic apparatus including: an encryption unit which carries out complex encryption by the complex application of a plurality of encrypting schemes to selected content, and an encoding unit which adds encryption information to the content which is encrypted by the encryption unit as mentioned above.

According to an aspect of still another exemplary embodiment, there is provided a method for decrypting content, the method including: receiving content which has been encrypted by the complex application of a plurality of encrypting schemes to the content, and decrypting the encrypted content using a plurality of decrypting schemes with reference to encryption information added to the encrypted content.

The complex encryption may include the complex application of the plurality of encrypting schemes on at least one of a frame basis, a field basis, and a line basis, and the complex decryption may include the complex application of the plurality of decrypting schemes on at least one of the frame basis, the field basis, and the line basis.

The plurality of encrypting schemes may include an HDCP-XOR encrypting scheme and an HDCP-XNOR encrypting scheme, and the plurality of decrypting schemes may include an HDCP-XOR decrypting scheme and an HDCP-XNOR decrypting scheme.

The encryption information may be referred to every frame if the content was decrypted on a frame basis. The encryption information may be referred to every field if the content was decrypted on a field basis. The encryption information may be referred to every line if the content was decrypted on the line basis.

According to an aspect of still another exemplary embodiment, there is provided an electronic apparatus including: a communication unit which receives content that was encrypted by the application of a plurality of encrypting schemes to selected content, a decryption unit which decrypts the thus-encrypted content using a plurality of decrypting schemes, and a controller which controls the decrypting operation of the decryption unit with reference to encryption information added to the encrypted content.

According to an aspect of still another exemplary embodiment, there is provided a method for updating a hacked key list of an electronic apparatus, the method including: at the electronic apparatus, receiving from an external apparatus a hacked key list stored in the external apparatus, and, at the electronic apparatus, updating a hacked key list stored in the electronic apparatus using the hacked key list received in the receiving operation.

The updating may include adding a hacked key, that is recorded on the hacked key list of the external apparatus, but does not exist in the hacked key list stored in the electronic apparatus, to the hacked key list of the electronic apparatus.

The method may further include, at the electronic apparatus, transmitting the hacked key list stored in the electronic apparatus to the external apparatus.

The hacked key list may be a hacked B key selection vector (BKSV) list.

The updating may be performed in any one of the following cases, 1) periodically, 2) when the external apparatus is connected, or 3) when there is a change in the hacked key list stored in the external apparatus.

The receiving may include receiving the hacked key list from one of a network, a broadcast signal, a storage medium, and content stored in a storage medium.

As described above, since the content is encrypted by the complex application of the plurality of encrypting schemes to the signal content, a means for encrypting digital contents can be reinforced. That is to say, the protection for digital content is strengthened.

Also, since the hacked key list stored in the electronic apparatus is updated with reference to the hacked key list stored in another external apparatus, or by receiving the hacked key list from the connected network, the broadcast signal, the storage medium, or the content stored in the storage medium, a means for authenticating an apparatus which requests digital contents can be reinforced. That is to say, the process for apparatus authentication is strengthened.

DETAILED DESCRIPTION

Hereinafter, the inventive concept will now be described in greater detail with reference to the accompanying drawings.

1. Configuration of Home Network

Figure 1:
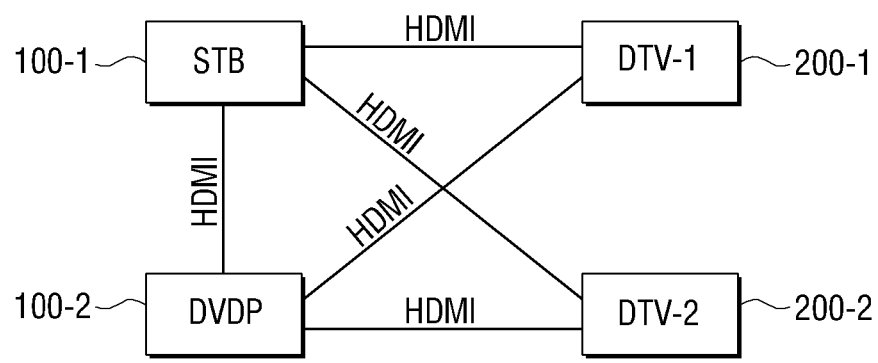
FIG. 1 is a view illustrating a home network to which the inventive concept is applicable.

FIG. 1 is a view illustrating a home network to which the inventive concept is applicable. The home network is established so that a set top box (STB) 100-1, a digital versatile disk player (DVDP) 100-2, a digital television (DTV)-1 200-1 and a DTV-2 200-2 communicate with one another.

More specifically, the STB 100-1 is communicably connected to the DTV-1 200-1 and the DTV-2 200-2 through a high definition multimedia interface (HDMI), and the DVDP 100-2 is also communicably connected to the DTV-1 200-1 and the DTV-2 200-2 via HDMI.

Each of the STB 100-1 and the DVDP 100-2 may be understood to constitute a source apparatus that provides content. Each of the DTV-1 200-1 and the DTV-2 200-2 may be understood to constitute a sink apparatus that receives the content.

Hereinafter, detailed configurations of a source apparatus and a sink apparatus will be explained. First, each of the STB 100-1 and the DVDP 100-2 will be referred to as a source apparatus and will be explained in detail with reference to FIG. 2.

2. Source Apparatus and Method for Encrypting Content

Figure 2:
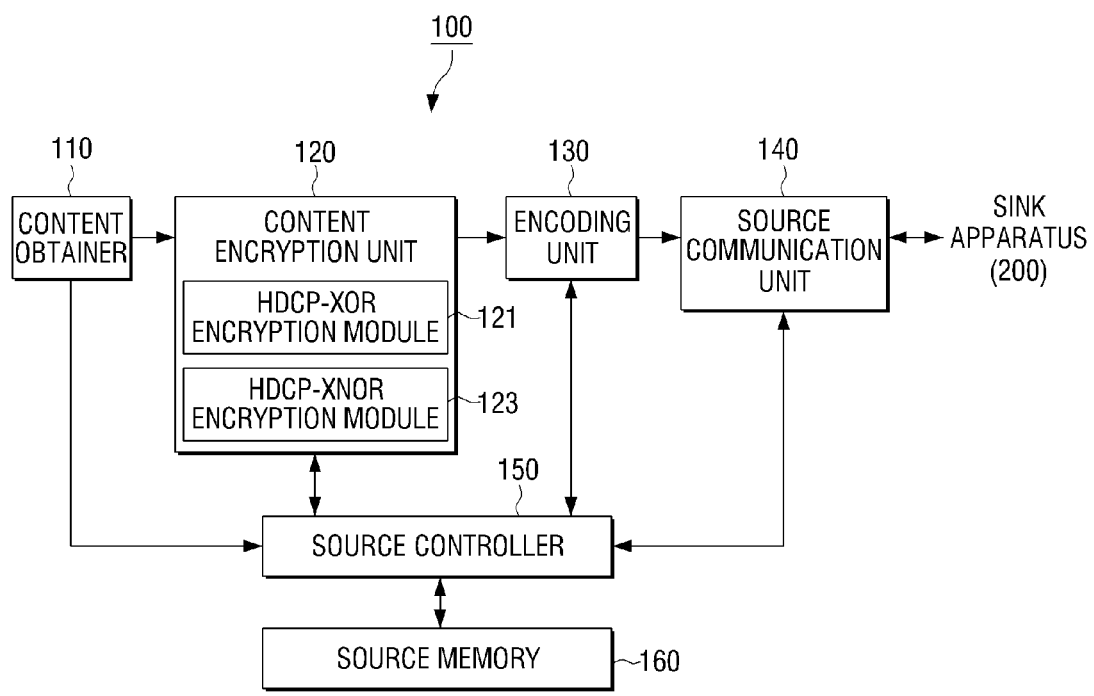
FIG. 2 is a block diagram illustrating a source apparatus of FIG. 1.

As shown in FIG. 2, a source apparatus 100 includes a content obtainer 110, a content encryption unit 120, an encoding unit 130, a source communication unit 140, a source controller 150, and a source memory 160.

The content obtainer 100 obtains content from a content source and provides the content to the content encryption unit 120. The content obtainer 110 may obtain the content in different ways according to the type of the source apparatus 100.

For example, 1) if the source apparatus 100 is the STB 100-1, the content obtainer 110 obtains content by receiving it from a broadcasting station through a cable or an antenna; 2) if the source apparatus 100 is the DVDP 100-2, the content obtainer 110 obtains content by reading out it from a DVD.

The content encryption unit 120 performs complex encryption on the content output from the content obtainer 110 using a high bandwidth digital content protection XOR (HDCP-XOR) encryption module 121 and an HDCP-XNOR encryption module 123. As a result, the content encryption unit 120 outputs the complex encrypted content. A method for carrying out the complex encryption of the content will be explained in detail below.

The details of the complex encryption performed by the content encryption unit 120 are carried out under the control of the source controller 150.

The encoding unit 130 adds encryption information and other necessary information, to the content encrypted in a complex manner by the content encryption unit 120, thereby generating a content stream. The encryption information may be recorded on a blanking section and may be transmitted along with the blanking section, or may be transmitted through a separate communication channel.

The encryption information is information about the details of the complex encryption performed by the content encryption unit 120 and is created by the source controller 150. This is because that the details of the complex encryption performed by the content encryption unit 120 are under the control of the source controller 150.

The source communication unit 140 transmits the content stream generated by the encoding unit 130 to a sink apparatus 200.

The source controller 150 controls the content obtaining operation of the content obtainer 110, the complex encrypting operation of the content encryption unit 120, the content stream generating operation of the encoding unit 130, and the content stream transmitting operation of the source communication unit 150.

Also, the source controller 150 authenticates the sink apparatus 200 connected through the source communication unit 140. Also, the source controller 150 updates a hacked B key selection vector (BKSV) list which is stored in the source memory 160 to be used to authenticate, separately from the authenticating operation.

Specifically, if the sink apparatus 200 transmits its own hacked BKSV list to the source apparatus 100, the source controller 150 compares the hacked BKSV list, which is received from the sink apparatus 200, and the hacked BKSV list which is stored in the source memory 160. If the lists are not identical, the source controller 150 updates the hacked BKSV list by adding any hacked BKSV that is not present in the hacked BKSV list of the source apparatus 100.

Figure 3:
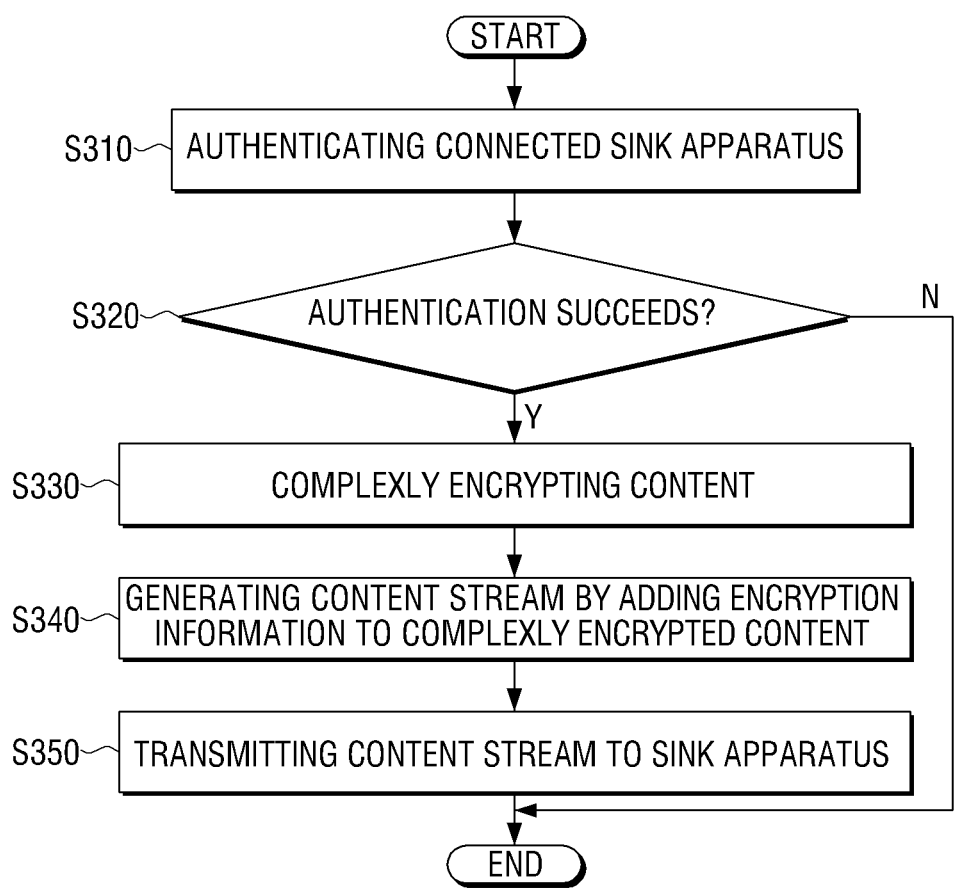
FIG. 3 is a flowchart to explain a method for encrypting a content according to an exemplary embodiment.

Hereinafter, a method for encrypting content using the source apparatus 100 of FIG. 2 will be explained, in detail, with reference to FIG. 3. FIG. 3 is a flowchart illustrating a method for encrypting content according to an exemplary embodiment.

As shown in FIG. 3, the source controller 150 authenticates the sink apparatus 200 which is connected through the source communication unit 140 (S310). The authenticating process performed in operation S310 is as described below.

First, the source controller 150 determines whether a BKSV received from the sink apparatus 200 is a hacked BKSV or not. Since a hacked BKSV list is stored in the source memory 160, the source controller 150 refers to the hacked BKSV list. If it is determined that the BKSV received from the sink apparatus 200 is a hacked BKSV, the authentication fails.

Next, the source controller 150 determines whether $R_0'$ generated based on an A key selection vector (AKSV) and $A_n$ is identical to $R_0$ received from the sink apparatus 200 along with the BKSV. The AKSV and $A_n$ are generated by the source controller 150 using an HDCP key and $R_0$ is generated by the sink apparatus 200. If $R_0' \neq R_0$, the authentication fails.

If the BKSV received from the sink apparatus 200 is not a hacked BKSV and if $R_0'=R_0$, the authentication succeeds.

If the authentication succeeds (S320-Y), the source controller 150 controls the content encryption unit 120 to perform complex encryption with respect to the content output from the content obtainer 110 (S330).

The term "complex encryption" refers to a method for encrypting a single content using two encrypting schemes. The complex encryption may be realized in various ways and will be explained in detail below.

First, the complex encryption may be applied on a per-frame basis. The content may consist of frames. More specifically, the complex encryption is performed by 1) performing HDCP-XOR with respect to specific frames among the frames that form the content, using the HDCP-XOR encryption module 121, and then 2) performing HDCP-XNOR encryption with respect to the remaining frames, using the HDCP-XNOR encryption module 123.

Second, the complex encryption may be applied on a per-field basis. The content may consist of fields. Specifically, the complex encryption is performed by 1) performing the HDCP-XOR encryption with respect to specific fields among the fields that form the content, using the HDCP-XOR encryption module 121, and then 2) performing the HDCP-XNOR encryption with respect to the remaining fields using the HDCP-XNOR encryption module 123.

Third, the complex encryption may be applied on a per-line basis. The frame or the field of the content may consist of lines. Specifically, the complex encryption is performed by 1) performing the HDCP-XOR encryption with respect to specific lines among the lines that form the frame or the field of the content, using the HDCP-XOR encryption module 121, and then 2) performing the HDCP-XNOR encryption with respect to the remaining lines using the HDCP-XNOR encryption module 123.

Fourth, the complex encryption may be performed by combining two or more of the above-described three ways.

After that, the source controller 150 controls the encoding unit 130 to generate a content stream by adding encryption information to the content encrypted in the above-described complex manner in operation S330 (S340).

The encryption information is a record of information about the encrypting schemes (HDCP-XOR encryption or HDCP-XNOR encryption) used to create the content recorded on the content stream to which the encryption information belongs.

Accordingly, 1) if the complex encryption is performed on the per-frame basis, the encryption information should be added to every frame, 2) if the complex encryption is performed on the per-field basis, the encryption information should be added to every field, and 3) If the complex encryption is performed on the per-line basis, the encryption information should be added to every line.

Regardless of which basis is used for the encryption, the encryption information may be added to every line. If the encryption information is added to every line, the decryption may be performed with reference to the encryption information regardless of whether the encryption is performed on the per-frame basis, the per-field basis, or the per-line basis, since the line is the smallest unit.

After that, the source communication unit 140 transmits the content stream generated in operation S340 to the sink apparatus 200 (S350).

If the authentication fails in operation S310 (S320-N), operations S330 to 350 are not performed. That is, the source apparatus 100 does not transmit the content to the sink apparatus 200.

3. Sink Apparatus and Method for Decrypting Content

Hereinafter, the DTV-1 200-1 and the DTV-2 200-2 will be referred to as examples of a sink apparatus 200 and will be explained with reference to FIG. 4.

Figure 4:
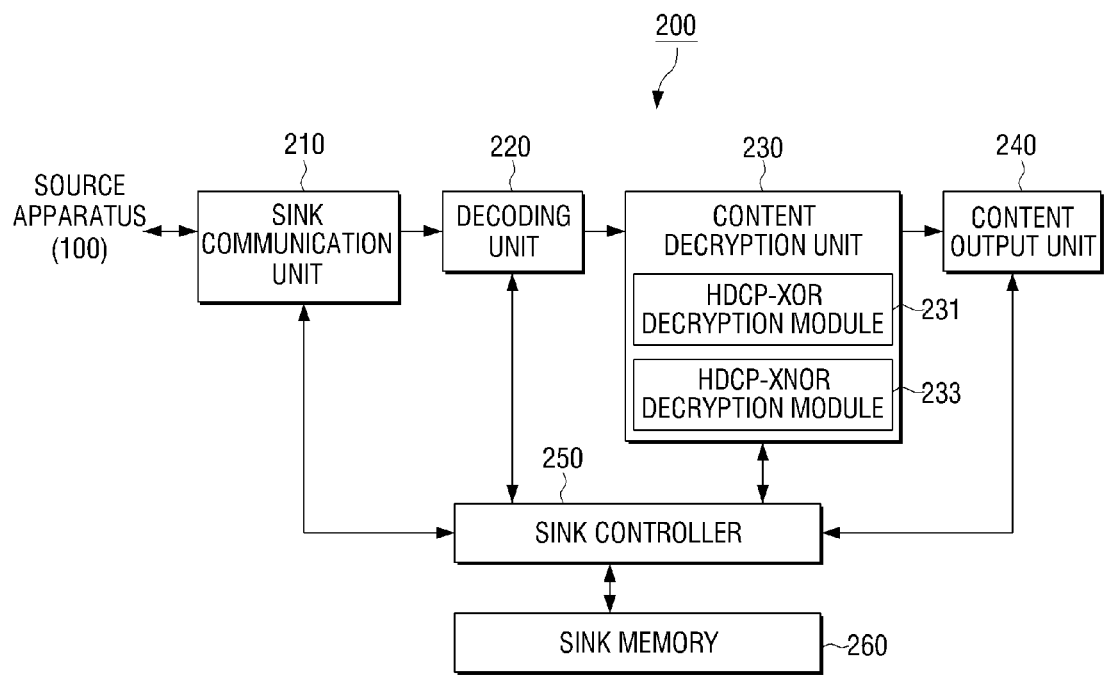
FIG. 4 is a block diagram illustrating a sink apparatus of FIG. 1.

As shown in FIG. 4, the sink apparatus 200 includes a sink communication unit 210, a decoding unit 220, a content decryption unit 230, a content output unit 240, a sink controller 250, and a sink memory 260.

The sink communication unit 210 receives a content stream from the source communication unit 140 of the source apparatus 100 and transmits the content stream to the decoding unit 220.

The decoding unit 220 decodes the content stream received, through the sink communication unit 210, from the source apparatus 100. The content stream includes the complex, encrypted content and the encryption information. The decoding unit 220 extracts from the content stream the complex, encrypted content, and extracts the encryption information. The encrypted content is sent to the content decryption unit 230 and the encryption information is sent to the sink controller 250.

The content decryption unit 230 decrypts the content transmitted from the decoding unit 220 using an HDCP-XOR decryption module 231 and an HDCP-XNOR decryption module 233. As a result, the content decryption unit 230 outputs the decrypted content.

The sink controller 250 controls the decrypting operation of the content decryption unit 230 based on the encryption information transmitted from the decoding unit 220.

The content output unit 240 outputs the content thus decrypted by the content decryption unit 230 and provides the content for the user. The content is output by the content output unit 240 in different ways in accordance with the type of the sink apparatus 200.

For example, if the sink apparatus 200 is the DTV 200-1 or 200-2, the content output unit 240 outputs the content through a display.

The sink controller 250 controls the content stream receiving operation of the sink communication unit 210, the decoding operation of the decoding unit 220, the complex decryption operation of the content decryption unit 230, and the content outputting operation of the content output unit 240.

The sink controller 250 performs an authentication process with respect to the source apparatus 100 connected through the sink communication unit 210. The sink controller 250 updates a hacked BKSV list which is stored in the sink memory 260 to be used to authenticate, separately from the previously mentioned authenticating operation.

More specifically, if the source apparatus 100 transmits its own hacked BKSV list to the sink apparatus 200, the sink controller 250 compares the hacked BKSV list received from the source apparatus 100 with the hacked BKSV list stored in the sink memory 260. If the lists are not identical, the sink controller 250 updates the BKSV list of the sink apparatus 200 by adding to it the hacked BKSV from the source apparatus 100 that is missing from the BKSV list of the sink apparatus 200.

Figure 5:
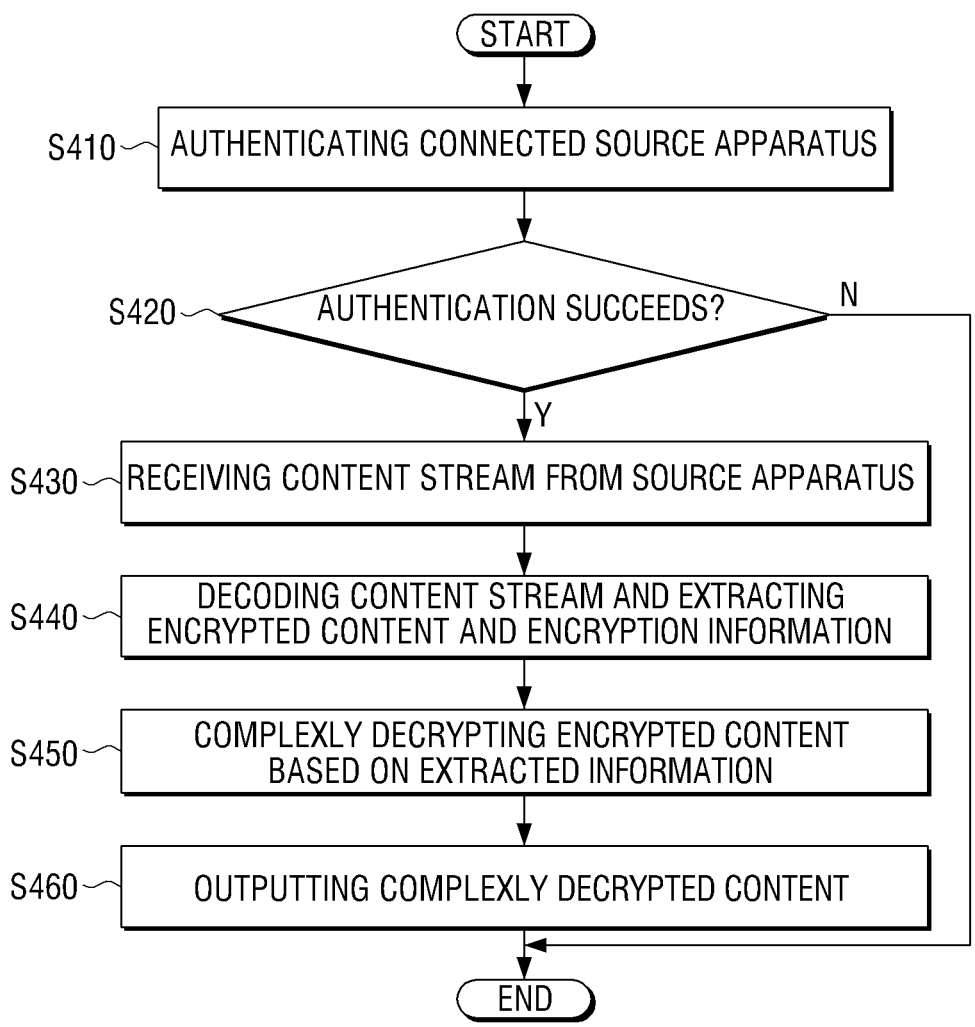
FIG. 5 is a flowchart to explain a method for decrypting a content according to another exemplary embodiment.

Hereinafter, a method for decrypting the content from the sink apparatus 200 shown in FIG. 4 will be explained with reference to FIG. 5. FIG. 5 is a flowchart illustrating a method for decrypting the content according to another exemplary embodiment.

As shown in FIG. 5, the sink controller 250 performs an authenticating process with respect to the source apparatus 100, which is connected through the sink communication unit 210 (S410). The authenticating process in operation S410 is the same as in operation S310 of FIG. 3.

If the authentication succeeds (S420-Y), the sink communication unit 210 receives the content stream from the source apparatus 100 (S430). The content stream received in operation S430 is the content stream transmitted in operation S350 of FIG. 3.

The content stream includes the encrypted content and the encryption information. The encrypted content is the content that was generated in operation S330 of FIG. 3, and the encryption information is the information that was added to the encrypted content in operation S340 of FIG. 3.

The decoding unit 220 decodes the content stream received in operation S430 and extracts the encrypted content and the encryption information (S440). The encrypted content extracted in operation S440 is transmitted to the content decryption unit 230; the encryption information is transmitted to the sink controller 250.

The sink controller 250 controls the content decryption unit 230 to perform complex decryption with respect to the encrypted content extracted in operation S440 based on the encryption information extracted in operation S440 (S450).

The complex decryption is an inverse operation of the complex encryption and is a method for decrypting a single content using two decrypting schemes. The complex decryption is performed based on the encryption information that was transmitted along with the encrypted content.

For example, in the case that the content is encrypted on the per-frame basis, 1) if it is determined that the frame is an HDCP-XOR encrypted frame, based on the encryption information, the sink controller 250 controls the content decryption unit 230 to decrypt the frame using the HDCP-XOR decryption module 231, and 2) if it is determined that the frame is an HDCP-XNOR encrypted frame, based on the encryption information, the sink controller 250 controls the content decryption unit 230 to decrypt the frame using the HDCP-XNOR decryption module 233.

After that, the content output unit 240 outputs the content, which has been decrypted, in operation 5450 and then provides the content to the user (S460).

If the authentication fails in operation 5420 (S420-N), operations 5430 to S460 are not performed. This is because the content stream is not transmitted from the source apparatus 100 if the authentication fails.

4. Method for Sharing Hacked BKSV of Home Apparatus

Figure 6:
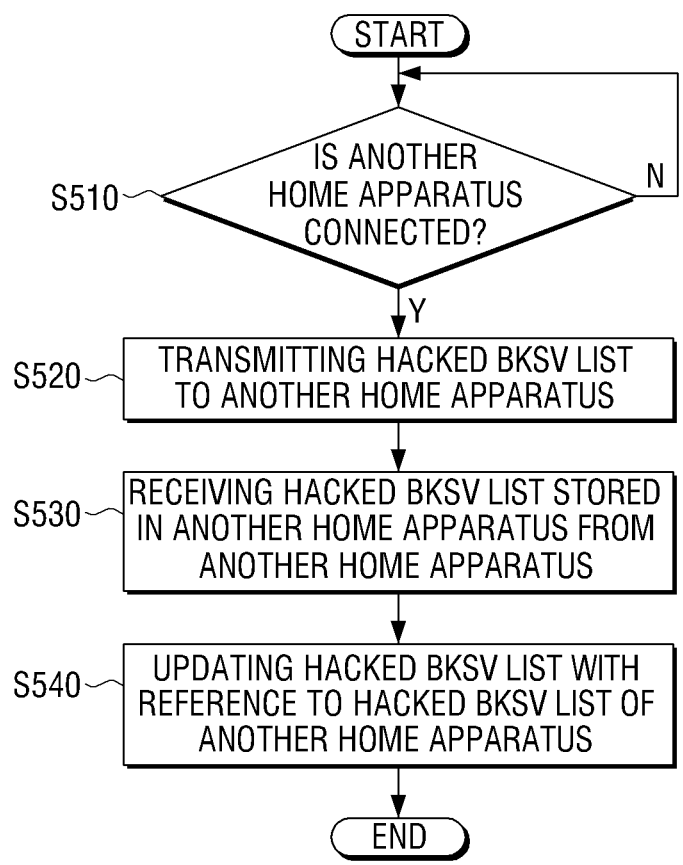
FIG. 6 is a flowchart to explain a method for updating a hacked B key selection vector (BKSV) list according to still another exemplary embodiment.

The source apparatus 100 and the sink apparatus 200 have a common feature in that they are home apparatuses. Hereinafter, a process of sharing a hacked BKSV list among the home apparatuses will be explained with reference to FIG. 6. FIG. 6 is a flowchart illustrating a method for updating a hacked BKSV list according to still another exemplary embodiment.

As shown in FIG. 6, if a home apparatus 100 or 200 is connected to another home apparatus through the communication unit 140 or 210 (S510-Y), the controller 150 or 250 transmits a hacked BKSV list stored in the memory 160 or 260 to the other home apparatus (S520).

The controller 150 or 250 receives the hacked BKSV list from another home apparatus through the communication unit 140 or 210 (S530).

The controller 150 or 250 updates its own hacked BKSV list, stored in the memory 160 or 260, with reference to the hacked BKSV list of the other home apparatus, which was received in operation S530 (S540).

More specifically, the controller 150 or 250 adds a hacked BKSV that is recorded on the hacked BKSV list of the other home apparatus, but is not in the hacked BKSV list of the home apparatus 100 or 200, to the hacked BKSV list of the home apparatus 100 or 200.

The hacked BKSV list may be updated 1) periodically, 2) if another home apparatus is connected, or 3) if there is a change in the hacked BKSV list of the one home apparatus 100 or 200 or in the hacked BKSV list of the other home apparatus. The hacked BKSV list is not necessarily shared only between a source apparatus and a sink apparatus. The hacked BKSV list may be shared among the source apparatuses, for example, or may be shared among the sink apparatuses. For example, the hacked BKSV list may be shared between the STB 100-1 and the DVDP 100-2, which are the source apparatuses in the home network of FIG. 1. Also, the hacked BKSV list may be shared between the STB 100-1 or the DVDP 100-2 and the DTV-1 200-1 or may be shared between the STB 100-1 or DVDP 100-2 and the DTV-2 200-2 in the home network of FIG. 1. Accordingly, the DTV-1 200-1 and the DTV-2 200-2 can share the hacked BKSV list by the media of the STB 100-1 or the DVDP 100-2.

The method for updating the hacked BKSV list is not necessarily carried out if the connection is made through an HDMI or a DVI. The hacked BKSV list may alternatively be updated by receiving a hacked BKSV list from a network in which apparatuses are connected to one another, from a broadcast signal, form a storage medium, or from a content stored in the storage medium.

For example, the hacked BKSV list may be updated by 1) receiving a hacked BKSV list from a server connected through a network, 2) receiving a hacked BKSV list recorded on a certain area of a broadcast signal, or 3) reading out a hacked BKSV list from a medium such as a BD, a DVD, a CD and a memory or from content stored in the medium.

5. Variations

The home network mentioned above is merely an example of a network. The inventive concept is applicable to a network other than the home network. Also, although the home apparatuses forming the home network are in this example connected to one another through the HDMI, it does not matter which connecting method is used in applying the inventive concept. Accordingly, the home apparatuses may be connected to one another in a method other than using HDMI.

The home apparatuses mentioned above are merely examples for convenience of explanation. The inventive concept is applicable to any other electronic apparatus.

Also, the encrypting schemes and the decrypting schemes are merely examples. They may be replaced with other schemes. Also, three or more encrypting schemes may be applied in a complex manner and three or more decrypting schemes may be applied in a complex manner.

Also, the hacked BKSV list is merely an example of a hacked key list. Accordingly, another kind of hacked key list may be used and updated.

The foregoing exemplary embodiments and advantages are merely examples and are not to be construed as limiting the present inventive concept. The exemplary embodiments can be readily applied by analogy to other types of apparatuses. Also, the description of the exemplary embodiments is intended to be illustrative, and not to limit the scope of the claims. Many alternatives, modifications, and variations will be apparent to those skilled in the art.

The invention claimed is:

1. A method for encrypting content, the method comprising:
   encrypting by using a plurality of different encrypting schemes to a single content to provide encrypted content; and
   adding encryption information to the encrypted content;
   wherein the encryption information indicates ones of the plurality of different encrypting schemes for subsequent use in decrypting corresponding portions of the encrypted content, and
   wherein the content is encrypted after an authentication to a connected apparatus succeeds,
   wherein the single content comprises a plurality of frames, each frame comprises a plurality of fields, and each frame or each field comprises a plurality of lines,
   wherein the encrypting comprises performing encryption by applying a first encryption method to a first line and a second encryption method to a second line through the remaining lines among the lines which form the frame or field, and
   wherein the adding encryption information comprises adding first information indicating the first encryption method which is used in the first line to the first line and adding second information indicating the second encryption method which is used in the second line to the second line.

2. The method as claimed in claim 1, wherein the encrypting comprises applying the plurality of different encrypting schemes on at least one of a per-frame basis, a per-field basis, and a per-line basis.

3. The method as claimed in claim 2, wherein the plurality of different encrypting schemes comprise a high bandwidth digital content protection (HDCP)-XOR encrypting scheme and an HDCP-XNOR encrypting scheme.

4. The method as claimed in claim 2, wherein the adding of the encryption information comprises:
   1) when the content is encrypted on the per-frame basis, adding the encryption information to every frame;
   2) when the content is encrypted on the per-field basis, adding the encryption information to every field; and
   3) when the content is encrypted on the per-line basis, adding the encryption information to every line.

5. The method as claimed in claim 1, further comprising:
   authenticating a connected apparatus; and
   transmitting a content stream comprising the encrypted content and the encryption information to the connected apparatus.

6. The method as claimed in claim 5, further comprising updating a hacked key list used in authenticating the connected apparatus.

7. The method as claimed in claim 6, wherein the updating comprises:
   receiving a hacked key list from the connected external apparatus; and
   when a hacked key in the hacked key list from the connected external apparatus is not in a stored hacked key list, updating the stored hacked key list to include the hacked key from the connected external apparatus.

8. An electronic apparatus comprising:
   an encryption unit which encrypts by using a plurality of different encrypting schemes to a single content to provide encrypted content; and
   an encoding unit which adds encryption information to the encrypted;
   wherein the encryption information indicates ones of the plurality of different encrypting schemes for subsequent use in decrypting corresponding portions of the encrypted content,
   wherein the encryption unit encrypts the content after an authentication to a connected apparatus succeeds,
   wherein the single content comprises a plurality of frames, each frame comprises a plurality of fields, and each frame or each field comprises a plurality of lines,
   wherein the encryption unit encrypts by applying a first encryption method to a first line and a second encryption method to a second line through the remaining lines among the lines which form the frame or field,
   wherein the encoding unit adds first information indicating the first encryption method which is used in the first line to the first line and adds second information indicating the second encryption method which is used in the second line to the second line,
   wherein at least one of the encryption unit and the encoding unit is implemented as a hardware component.

9. A method for decrypting content, the method comprising:
   receiving a content stream which includes encrypted content and encryption information; and
   decrypting the encrypted content using a plurality of different decrypting schemes on portions of the encrypted content, wherein the one of the plurality of different decrypting schemes used is selected based on the encryption information,
   wherein the encrypted content is encrypted after an authentication to a connected apparatus succeeds,
   wherein a single content comprises a plurality of frames, each frame comprises a plurality of fields, and each frame or each field comprises a plurality of lines,
   wherein the encrypted content is encrypted by applying a first encryption method to a first line and a second encryption method to a second line through the remaining lines among the lines which form the frame or field,
   wherein first information indicating the first encryption method which is used in the first line is added to the first line and second information indicating the second encryption method which is used in the second line is added to the second line.

10. The method as claimed in claim 9, wherein the decrypting comprises complexly applying the selected ones of the plurality of different decrypting schemes on at least one of a per-frame basis, a per-field basis, and a per-line basis.

11. The method as claimed in claim 10, wherein the plurality of different decrypting schemes comprise an HDCP-XOR decrypting scheme and an HDCP-XNOR decrypting scheme.

12. The method as claimed in claim 10, wherein:
1) the encryption information is referred to every frame when the encrypted content is decrypted on the per-frame basis,
2) the encryption information is referred to every field when the encrypted content is decrypted on the per-field basis, and
3) the encryption information is referred to every line when the encrypted content is decrypted on the per-line basis.

13. An electronic apparatus comprising:
a communication unit which receives a content stream comprising encryption information and encrypted content;
a decryption unit which decrypts the encrypted content using a plurality of different decrypting schemes on portions of the encrypted content; and
a controller which controls the decryption unit with reference to the encryption information so as to carry out selected ones of the plurality of different decrypting schemes in accordance with the encryption information,
wherein the decryption unit decrypts the encrypted content which is encrypted after an authentication to a connected apparatus succeeds,
wherein a single content comprises a plurality of frames, each frame comprises a plurality of fields, and each frame or each field comprises a plurality of lines,
wherein the decryption unit decrypts the encryped content which is encrypted by applying a first encryption method to a first line and a second encryption method to a second line through the remaining lines among the lines which form the frame or field,
wherein the decryption unit decrypts the encrypted content in which first information indicating the first encryption method which is used in the first line is added to the first line and second information indicating the second encryption method which is used in the second line is added to the second line,
wherein at least one of the communication unit, the decryption unit, and the controller is implemented as a hardware component.

14. A content playing device, comprising: a controller that controls a communication unit, a decoding unit, a decryption unit, and an output unit;
wherein:
the communication unit receives a content stream;
the decoding unit extracts encrypted content and encryption information from the content stream;
the control unit uses the encryption information to control the decryption unit in decrypting the encrypted content so as to produce unencrypted content; and
the output unit outputs the unencrypted content,
wherein the decoding unit extracts the encrypted content which is encrypted after an authentication to a connected apparatus succeeds,
wherein a single content comprises a plurality of frames, each frame comprises a plurality of fields, and each frame or each field comprises a plurality of lines,
wherein the decoding unit extracts the encrypted content decrypts which is encrypted by applying a first encryption method to a first line and a second encryption method to a second line through the remaining lines among the lines which form the frame or field,
wherein the decoding unit extracts the encrypted content in which first information indicating the first encryption method which is used in the first line is added to the first line and second information indicating the second encryption method which is used in the second line is added to the second line,
wherein at least one of the controller, the communication unit, the decoding unit, the control unit, and the output unit is implemented as a hardware component.

15. The content playing device as set forth in claim 14, wherein the encryption information indicates one of at least two different encryption schemes to be used on different portions of the encrypted content.

16. The content playing device as set forth in claim 15, wherein the different portions of the encrypted content are different content frames.

17. The content playing device as set forth in claim 15, wherein the different portions of the encrypted content are different content fields.

18. The content playing device as set forth in claim 15, wherein the different portions of the encrypted content are different content lines.

* * * * *